US010200912B2

(12) United States Patent
Wang et al.

(10) Patent No.: US 10,200,912 B2
(45) Date of Patent: Feb. 5, 2019

(54) METHOD AND DEVICE FOR SETTING UP LOCAL BREAKOUT BEARERS

(71) Applicant: Samsung Electronics Co., Ltd, Gyeonggi-do (KR)

(72) Inventors: Hong Wang, Beijing (CN); Lixiang Xu, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/021,665

(22) PCT Filed: Sep. 12, 2014

(86) PCT No.: PCT/KR2014/008541
§ 371 (c)(1),
(2) Date: Mar. 11, 2016

(87) PCT Pub. No.: WO2015/037947
PCT Pub. Date: Mar. 19, 2015

(65) Prior Publication Data
US 2016/0227439 A1    Aug. 4, 2016

(30) Foreign Application Priority Data

Sep. 13, 2013 (CN) .......................... 2013 1 0418053

(51) Int. Cl.
*H04W 28/08* (2009.01)
*H04W 76/10* (2018.01)
(Continued)

(52) U.S. Cl.
CPC ......... *H04W 28/085* (2013.01); *H04W 76/10* (2018.02); *H04W 76/12* (2018.02); *H04W 84/045* (2013.01)

(58) Field of Classification Search
CPC . H04W 76/022; H04W 76/02; H04W 84/045; H04W 28/085; H04W 28/08
See application file for complete search history.

(56) References Cited

U.S. PATENT DOCUMENTS

2011/0310843 A1    12/2011 Vesterinen
2012/0002608 A1    1/2012 Vesterinen et al.
(Continued)

FOREIGN PATENT DOCUMENTS

| CN | 102196405 A | 9/2011 |
| CN | 103026777 A | 4/2013 |
| CN | 103297947 A | 9/2013 |

OTHER PUBLICATIONS

International Search Report dated Jan. 8, 2015 in connection with International Patent Application No. PCT/KR2014/008541, 3 pages.
(Continued)

*Primary Examiner* — Ian N Moore
*Assistant Examiner* — Brian T Le

(57) ABSTRACT

Examples of the present disclosure describe a method for setting up local breakout bearers, including: sending, by a master base station (MeNB), an IP address of a local gateway (LGW) corresponding to a neighbor base station; receiving, by the MeNB, correlation identifier information associated with the LGW; wherein the correlation identifier information comprises a tunnel number indicating a local breakout bearer is to be set up; forwarding, by the MeNB, the correlation identifier information; and setting up, by the neighbor base station, the local breakout bearer with the LGW according to the correlation identifier information. Examples of the present disclosure also describe another method for setting up local breakout bearers and a device corresponding to the method. When the technical scheme described in various examples of the present disclosure is employed, the service local breakout is supported in the
(Continued)

small cell architecture, therefore the load on the core network backhaul can be reduced, the throughput of user data can be improved, and the data loss can be avoided.

8 Claims, 6 Drawing Sheets

(51) Int. Cl.
*H04W 76/12* (2018.01)
*H04W 84/04* (2009.01)

(56) References Cited

U.S. PATENT DOCUMENTS

| | | |
|---|---|---|
| 2012/0039323 A1 | 2/2012 | Hirano et al. |
| 2012/0093074 A1 | 4/2012 | Sairanen et al. |
| 2012/0108240 A1 | 5/2012 | Liu et al. |
| 2013/0010753 A1 | 1/2013 | Chen et al. |
| 2013/0201966 A1 | 8/2013 | Weng et al. |
| 2015/0010010 A1 | 1/2015 | Xie et al. |

OTHER PUBLICATIONS

Written Opinion of the International Searching Authority dated Jan. 8, 2015 in connection with International Patent Application No. PCT/KR2014/008541, 7 pages.

Communication from a foreign patent office in a counterpart foreign application, ,, "State Intellectual Property Office of the People's Republic of China, The First Office Action," Application No. CN 201310418053.0, dated Aug. 2, 2018, 17 pages.

[Fig. 1]
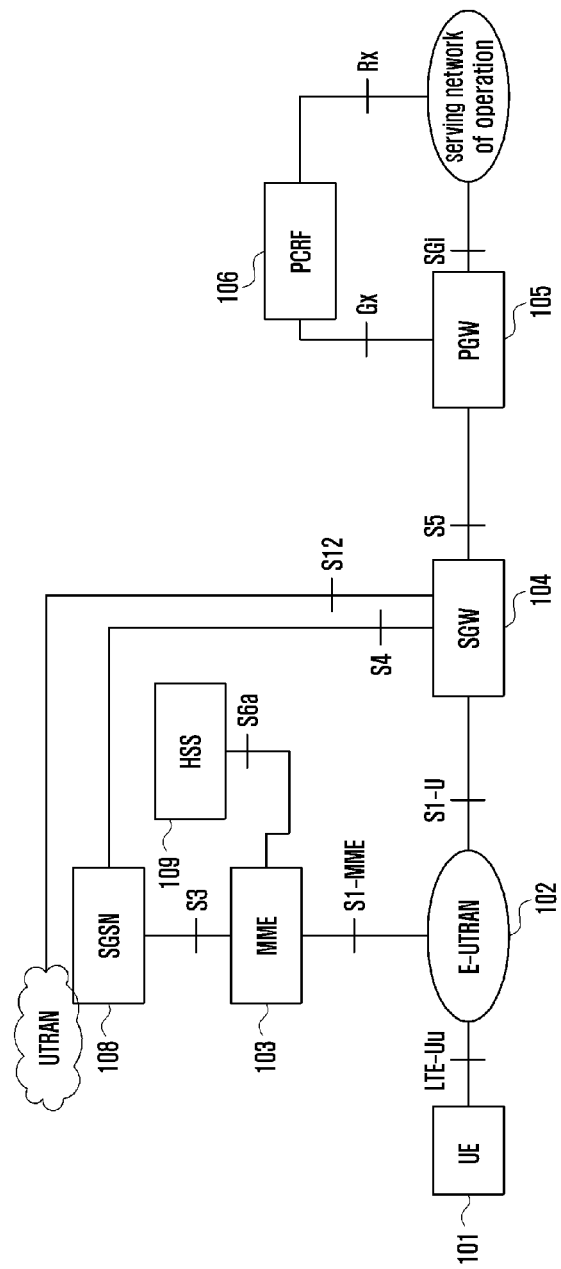

[Fig. 2]
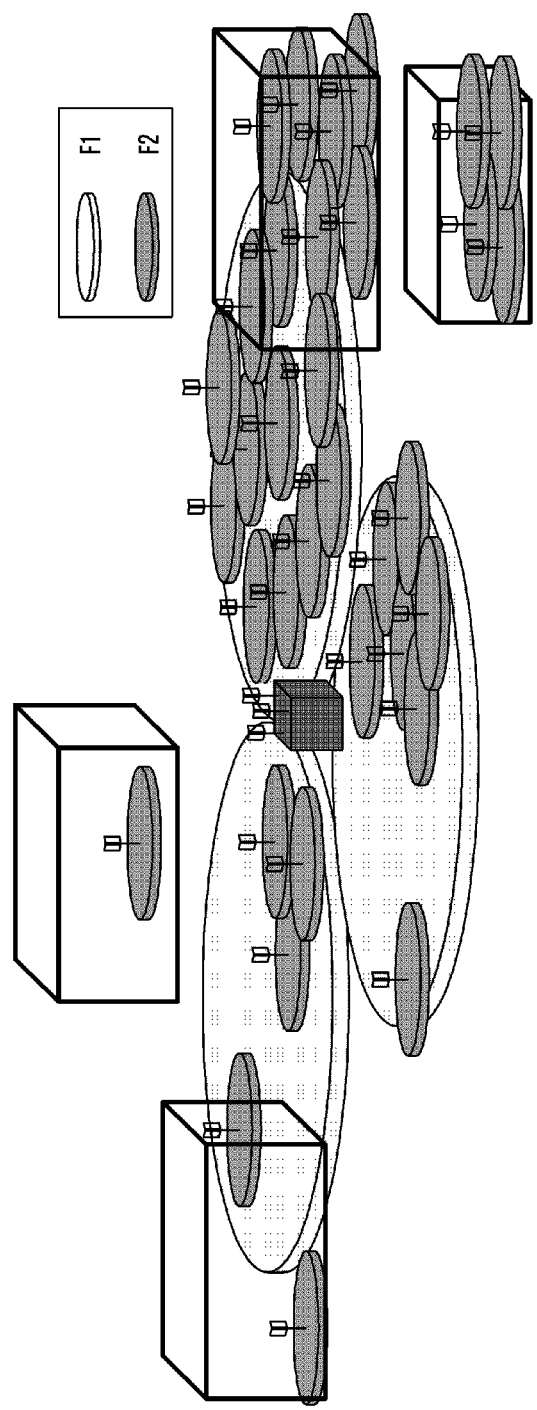

[Fig. 3]
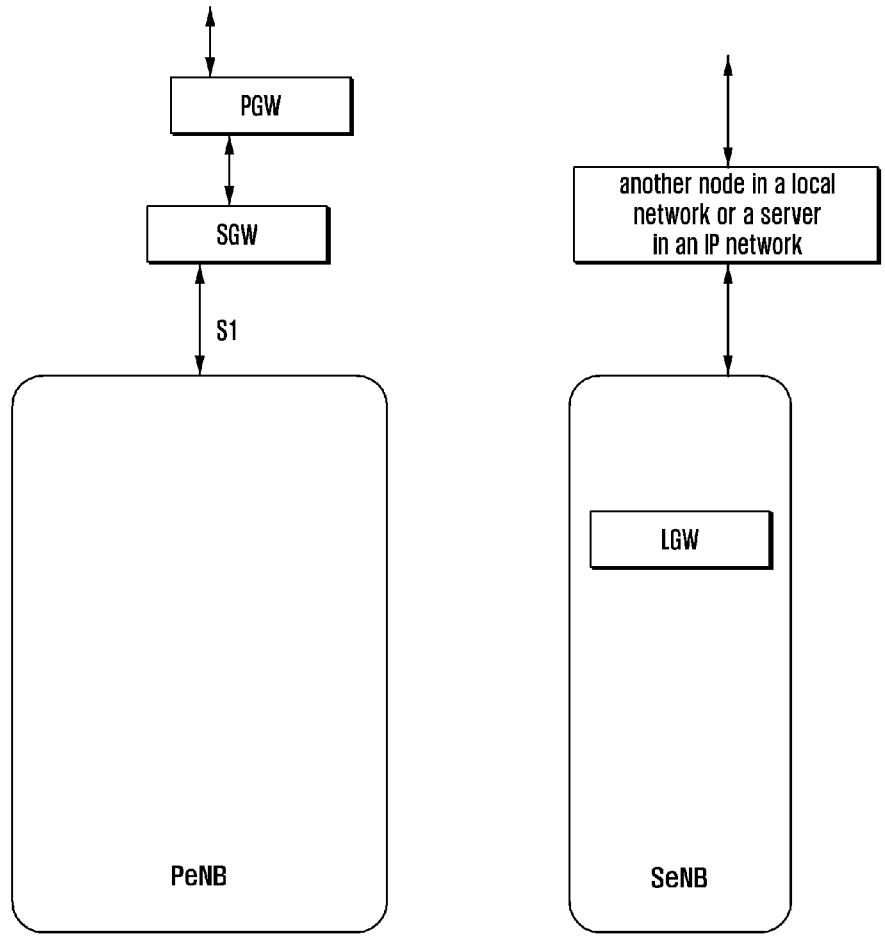
[Fig. 4]
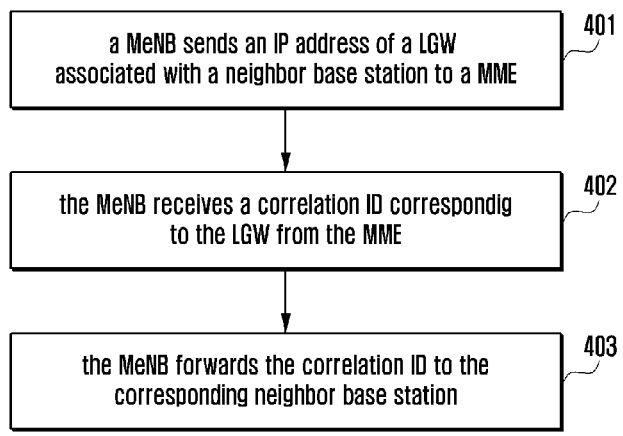

[Fig. 5]
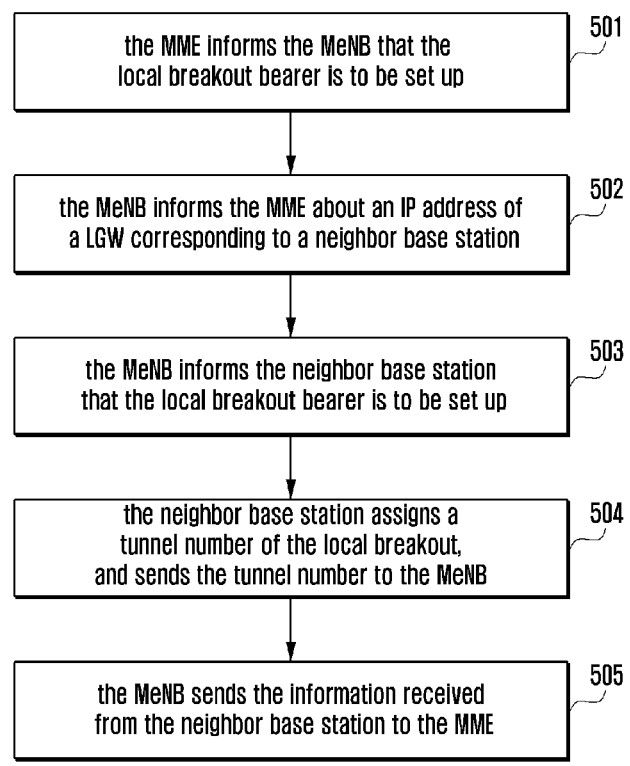

[Fig. 6]
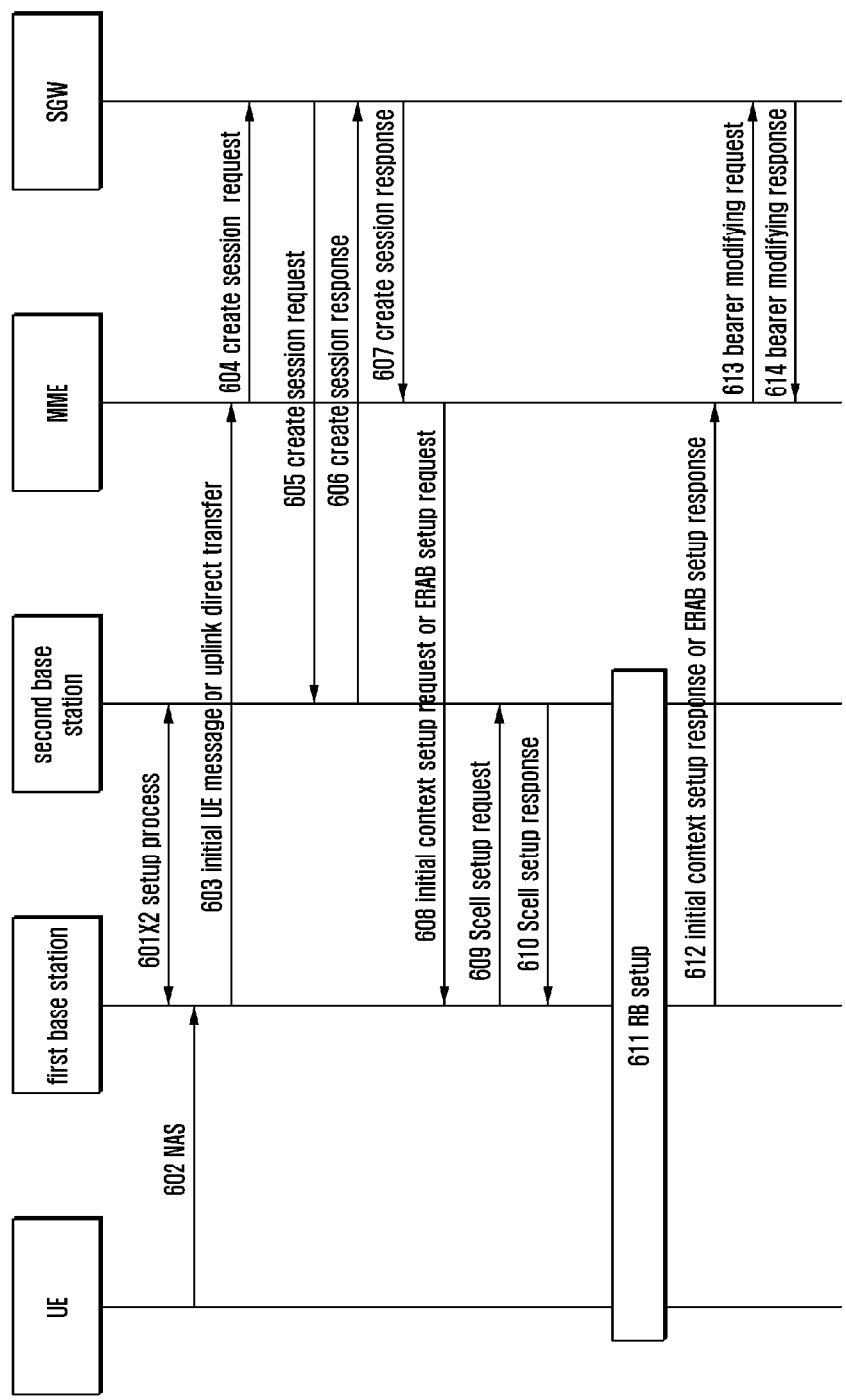

[Fig. 7]
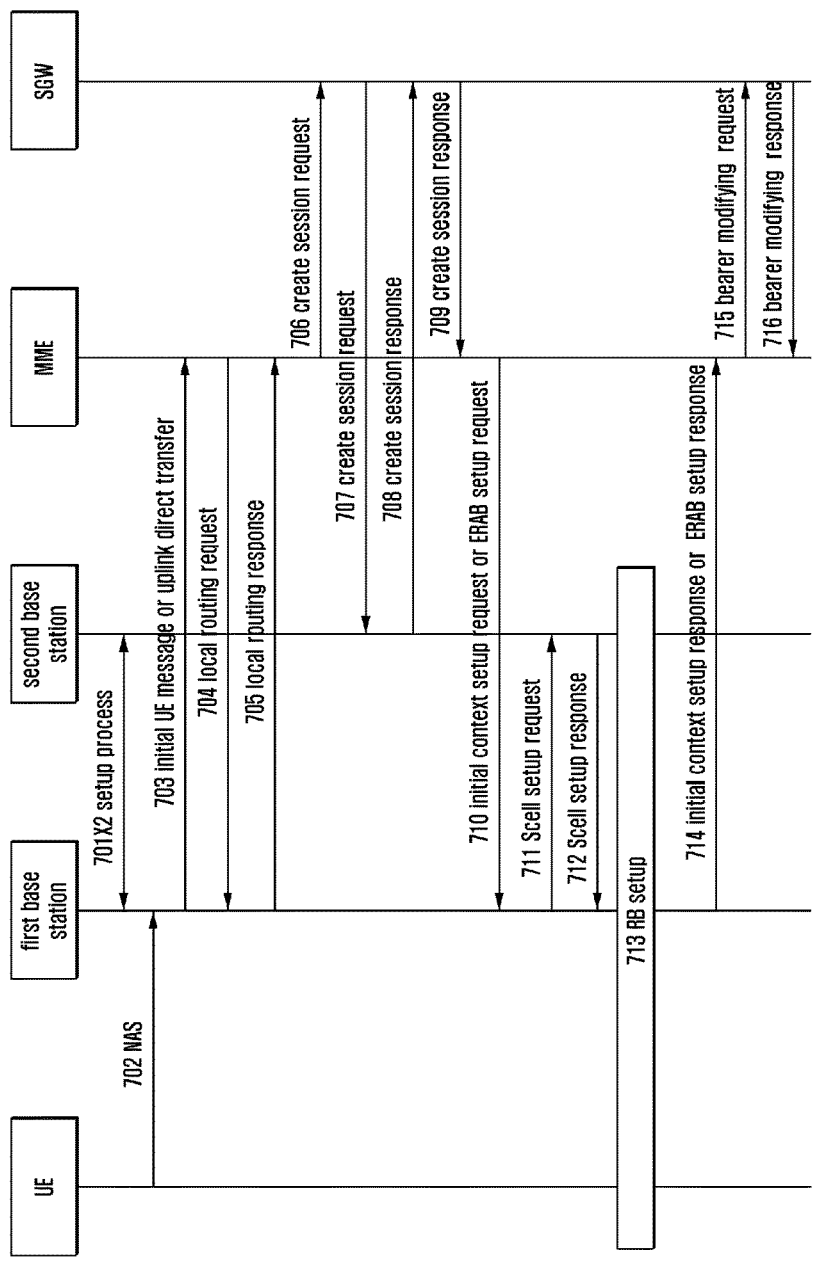
[Fig. 8]
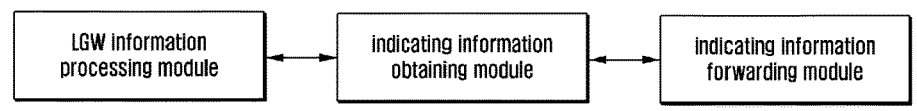
[Fig. 9]
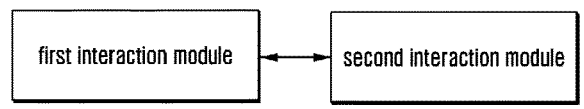

METHOD AND DEVICE FOR SETTING UP LOCAL BREAKOUT BEARERS

CROSS-REFERENCE TO RELATED APPLICATION(S)

The present application claims priority under 35 U.S.C. § 365 to International Patent Application No. PCT/KR2014/008541 filed Sep. 12, 2014, entitled "METHOD AND DEVICE FOR SETTING UP LOCAL BREAKOUT BEARERS", and, through International Patent Application No. PCT/KR2014/008541, to Chinese Patent Application No. 201310418053.0 filed Sep. 13, 2013, each of which are incorporated herein by reference into the present disclosure as if fully set forth herein.

TECHNICAL FIELD

The present disclosure relates to radio communication technologies, and particularly, to a method and device for setting up local breakout bearers, so as to support service local breakout in a small cell architecture.

BACKGROUND ART

Modern mobile communications increasingly tend to provide multimedia services that are transmitted with a high speed to users. FIG. 1 is a schematic diagram illustrating a system architecture of System Architecture Evolution (SAE).

In FIG. 1, User Equipment (UE) 101 is a terminal device configured to receive data. Evolution-Universal Terrestrial Radio Access Network (E-UTRAN) 102 is a radio access network, which includes a macro base station (eNodeB/NodeB, eNB) used for providing a radio network access port for the UE. Mobile Management Entity (MME) 103 is configured to manage mobile context, session context and security information of the UE. Service Gateway (SGW) 104 mainly provides functions of a user plane. MME 103 and SGW 104 may be in a same physical entity. Packet data network gateway (PGW) 105 provides functions like charging and lawful interception. PGW 105 and SGW 104 may be in the same physical entity. Policy and Charging Rules Function Entity (PCRF) 106 is configured to provide a Quality of Service (QoS) policy and charging guidelines. Service GPRS Supporting Node (SGSN) 108 is a network node device configured to provide routing for data transmission in a Universal Mobile Telecommunication System (UMTS). Home Subscriber Server (HSS) 109 is a home subsystem of the UE, and is configured to protect user information including a current position of the UE, an address of a service node, user security information, packet data context of the UE, etc.

3GPP version 12 (Rel-12) proposes a requirement of small cell enhancement. Target scenes of the small cell enhancement include a scene in which there is the coverage of a macro cell and a scene in which there is no coverage of the macro cell, indoor enhancement and outdoor enhancement, ideal backhaul enhancement and non-ideal backhaul enhancement, as shown in FIG. 2.

Under the situation where there is the coverage of the macro cell, carrier aggregation between different base stations may be employed. The macro cell and a small cell may work in different frequency bands. There are multiple architectures employing the carrier aggregation between different base stations, such as the architecture based on Radio Access Network (RAN) splitting and the architecture based on Core Network (CN) splitting. Base stations involved in the carrier aggregation may be divided into a master base station (may be called MeNB) and a secondary base station (may be called SeNB). Interaction between the SeNB and the core network on a control plane is performed through the MeNB. Main RRC functions and control of the UE at an air interface are also located in the MeNB. The architecture based on the RAN splitting means that a data bearer is set up on the MeNB and the SeNB, and the data is forwarded to the SeNB through the MeNB. The architecture based on the CN splitting means that for a bear set up on the SeNB, the data is directly send from the SGW in the core network to the SeNB, and the data at the user plane is not forwarded through the MeNB.

Supporting service local breakout under the small cell architecture may reduce backhaul load. Currently, there is no solution about how to set up the local breakout in the small cell.

DISCLOSURE OF INVENTION

Technical Problem

Examples of the present disclosure describe a method and a device for setting up local breakout bearers, so as to support service local breakout in a small cell architecture, therefore the load on the core network backhaul can be reduced, the throughput of user data can be improved, and data loss can be avoided.

Solution to Problem

Examples of the present disclosure describe a method for setting up local breakout bearers, including:
sending, by a master base station (MeNB), an IP address of a local gateway (LGW) corresponding to a neighbor base station;
receiving, by the MeNB, correlation identifier information associated with the LGW;
wherein the correlation identifier information comprises a tunnel number indicating a local breakout bearer is to be set up; and
forwarding, by the MeNB, the correlation identifier information.

According to an example of the present disclosure, the operation of sending, by the MeNB, the IP address of the LGW corresponding to the neighbor base station includes:
based on a measurement report of a user equipment (UE), sending, by the MeNB, an IP address of a LGW corresponding to a base station capable of being a secondary base station (SeNB) of the UE; or
sending, by the MeNB, an IP address of a LGW corresponding to the SeNB of the UE.

According to an example of the present disclosure, the method further includes:
during an X2 setup process and/or a bearer setup process, receiving, by the MeNB, an IP address of a LGW collocated with the neighbor base station.

According to an example of the present disclosure, when the neighbor base station supports N types of the local breakout bearer, the IP address of the LGW includes IP addresses of LGWs respectively corresponding to the N types of the local breakout bearer, wherein N is greater than or equal to 2.

According to an example of the present disclosure, the operation of receiving, by the MeNB, the correlation identifier information associated with the LGW includes:

receiving, by the MeNB, N pieces of the correlation indication information;

wherein the N pieces of the correlation indication information respectively correspond to the N types of the local breakout bearer; and determining, by the MeNB according to an IP address of a LGW carried in each of the N pieces of the correlation indication information or information capable of indicating the IP address of the LGW carried in each of the N pieces of the correlation indication information, the N types of the local breakout bearer respectively corresponding to the N pieces of the correlation indication information.

Examples of the present disclosure describe a device, including:

a local gateway (LGW) information processing module, configured to send an IP address of a LGW corresponding to a neighbor base station;

an indicating information obtaining module, configured to receive correlation identifier information associated with the LGW; wherein the correlation identifier information comprises a tunnel number which indicates to set up a local breakout bearer; and an indicating information forwarding module, configured to forward the correlation identifier information.

Examples of the present disclosure describe a method for setting up local breakout bearers, which is applied to a MME and includes:

receiving, by a Mobile Management Entity (MME), an IP address of a local gateway (LGW) corresponding to a neighbor base station of a master base station (MeNB); and sending, by the MME, correlation identifier information associated with the LGW;

wherein the correlation identifier information comprises a tunnel number indicating a local breakout bearer is to be set up.

Examples of the present disclosure describe a method for setting up local breakout bearers, which is applied to a neighbor base station of a MeNB and includes:

receiving correlation identifier information associated with a local gateway (LGW); and setting up a local breakout bearer with the LGW according to the correlation identifier information.

Examples of the present disclosure describe a method for setting up local breakout bearers, including:

sending, by a master base station (MeNB), an IP address of a local gateway (LGW) corresponding to a neighbor base station to a Mobile Management Entity (MME);

sending, by the MME, correlation identifier information associated with the LGW to the MeNB;

wherein the correlation identifier information comprises a tunnel number which is assigned by the LGW and indicates a local breakout bearer is to be set up;

forwarding, by the MeNB, the correlation identifier information to the neighbor base station; and setting up, by the neighbor base station, the local breakout bearer with the LGW according to the correlation identifier information.

As can be seen from the above technical scheme, according to the method and device for setting up local breakout bearers described in various examples of the present disclosure, the IP address of the LGW corresponding to the neighbor base station is sent to the MME through the MeNB and the correlation identifier information associated with the LGW is received from the MME, then the correlation identifier information is forwarded to the neighbor base station, so that the neighbor base station sets up the local breakout bearer with the LGW according to the correlation identifier information. As such, the service local breakout is supported in the small cell architecture, and the UE can perform data breakout using a node in the local network under the small cell architecture, therefore the load on the core network backhaul can be reduced, the throughput of user data can be improved, the data loss can be avoided, and the user experience can be improved.

Examples of the present disclosure describe a method for setting up local breakout bearers, including:

learning, by a master base station (MeNB) that a local breakout bearer is to be set up;

informing, by the MeNB, setup of the local breakout bearer;

receiving, by the MeNB, a downlink tunnel number of local breakout; and sending, by the MeNB, an IP address of a local gateway (LGW) corresponding to a neighbor base station, and sending the downlink tunnel number of the local breakout.

According to an example of the present disclosure, the operation of sending, by the MeNB, the IP address of the LGW corresponding to the neighbor base station includes:

based on a measurement report of a user equipment (UE), sending, by the MeNB, an IP address of a LGW corresponding to a base station capable of being a secondary base station (SeNB) of the UE.

According to an example of the present disclosure, when a common bearer is set up for the UE, the method further includes:

receiving, by the MeNB, an uplink tunnel number and sending the uplink tunnel number.

Examples of the present disclosure describe a device, including:

a first interaction module, configured to learn that a local breakout bearer is to be set up; and a second interaction module, configured to inform setup of the local breakout bearer, and receive a downlink tunnel number of local breakout;

wherein the first interaction module is further configured to send an IP address of a local gateway (LGW) corresponding to a neighbor base station, and send the downlink tunnel number of the local breakout.

Examples of the present disclosure describe a method for setting up local breakout bearers, which is applied to a MME and includes:

informing, by a Mobile Management Entity (MME), that a local breakout bearer is to be set up; and receiving, by the MME, an IP address of a local gateway (LGW) corresponding to a neighbor base station of a master base station (MeNB) and a downlink tunnel number of local breakout.

Examples of the present disclosure describe a method for setting up local breakout bearers, which is applied to a neighbor base station of a MeNB and includes:

receiving a notice of setting up a local breakout bearer; and assigning and sending a downlink bearer number of local breakout.

Examples of the present disclosure describe a method for setting up local breakout bearers, including:

informing, by a Mobile Management Entity (MME), a master base station (MeNB) that a local breakout bearer is to be set up;

informing, by the MeNB, a neighbor base station to set up the local breakout bearer;

sending, by the neighbor base station, a downlink tunnel number of local breakout assigned by the neighbor base station to the MeNB; and sending, by the MeNB, an IP address of a local gateway (LGW) corresponding to the neighbor base station to the MME, and sending information received from the neighbor base station to the MME.

According to the method and device for setting up local breakout bearers described in various examples of the present disclosure, the MME informs the MeNB that a local breakout bearer is to be set up and the MeNB informs the neighbor base station to set up the local breakout bearer, and the MeNB sends information related to local breakout to the MME. Therefore, the local breakout bearer can not only be set up before the UE sets up a bearer, but also be set up in the form of gateway reconfiguration after the UE sets up a common bearer. As such, the service local breakout is supported in the small cell architecture, and the UE can perform data breakout using a node in the local network under the small cell architecture, therefore the load on the core network backhaul can be reduced, the throughput of user data can be improved, the data loss can be avoided, and the user experience can be improved.

BRIEF DESCRIPTION OF DRAWINGS

FIG. 1 is a schematic diagram illustrating a conventional system architecture of the SAE, according to an example of the present disclosure.

FIG. 2 is a schematic diagram illustrating the employment of the small cell enhancement, according to an example of the present disclosure.

FIG. 3 is a schematic diagram illustrating an architecture supporting the local breakout under the small cell architecture, according to an example of the present disclosure.

FIG. 4 is a flowchart illustrating a first method for setting up local breakout bearers, according to an example of the present disclosure.

FIG. 5 is a flowchart illustrating a second method for setting up local breakout bearers, according to an example of the present disclosure.

FIG. 6 is a flowchart illustrating a first example embodiment of supporting the service local breakout under the small cell architecture, according to an example of the present disclosure.

FIG. 7 is a flowchart illustrating a second example embodiment of supporting the service local breakout under the small cell architecture, according to an example of the present disclosure.

FIG. 8 is a schematic diagram illustrating a structure of a device, according to an example of the present disclosure.

FIG. 9 is a schematic diagram illustrating a structure of another device, according to an example of the present disclosure.

MODE FOR THE INVENTION

Hereinafter, the present disclosure is described in further detail with reference to the accompanying drawings and examples to make the objective, technical solution and merits therein clearer.

FIG. 3 is a schematic diagram illustrating an architecture where a small cell supports local breakout. A local gateway (LGW) is located at a base station and collocates with the base station. A local breakout service is transmitted from the base station to another node in a local network or a server in an IP network. As such, backhaul of S1 and X2 may be saved.

In order to support the service local breakout in the small cell architecture, examples of the present disclosure describe two technical schemes of setting up local breakout bearers. A local breakout bearer in the examples of the present disclosure refers to a bearer accessing the other node in the local network or the server in the IP network directly through the local network instead of a macro network of an operator. For example, a Selected IP Traffic Offload (SIPTO) bearer and a Local IP Access (LIPA) bearer are the local breakout bearers.

FIG. 4 is a flowchart illustrating a first method for setting up local breakout bearers, according to an example of the present disclosure. The method is described taking the architecture as shown in FIG. 3 as an example, but not limited to the architecture as shown in FIG. 3. The method may be applied to other architectures. The method as shown in FIG. 4 may include following operations.

At block 401, a master base station (MeNB) sends an IP address of a LGW associated with a neighbor base station to a MME.

The technical scheme described in various examples of the present disclosure is used for setting up local breakout bearers for a UE. As such, hereinafter a non-specific UE is taken as an example to describe the technical scheme. The MeNB and a SeNB refer to a MeNB and a SeNB of the non-specific UE.

In this case, the MeNB is an end point of an S1 control plane of the UE. The neighbor base station refers to a base station which is possible to be the SeNB of the UE or a base station which is the SeNB of the UE. The MeNB may determine which base station is a neighbor base station meeting the above condition according to a following way. Based on a measurement report of the UE, when the MeNB determines that a signal of a base station is good enough, i.e., the signal quality reaches a preset threshold, the base station may be configured as the SeNB of the UE. As such, the MeNB may determine the base station as the neighbor base station. Or, the MeNB has set up a bearer of the UE on a base station and the base station is the SeNB of the UE, the MeNB may determine the base station as the neighbor base station.

Before block 401, the MeNB may obtain the IP address of the LGW of the neighbor base station, which may be implemented according to two ways respectively shown as follows.

According to the first way, during the process of setting up X2, the neighbor base station sends the IP address of the collocated LGW to the MeNB.

According to the second way, assuming the MeNB has set up the bearer of the UE on a neighbor base station, during the process of setting up the bearer, the neighbor base station sends the IP address of the collocated LGW to a first base station.

If the neighbor base station simultaneously supports a variety of types of the local breakout bearer, e.g., simultaneously supports SIPTO or LIPA, the IP address of the LGW is configured according to different types of the local breakout bearer. In other words, when the neighbor base station sends the IP address of the LGW to the MeNB, the neighbor base station indicates a type of the local breakout bearer corresponding to an IP address of each LGW. When the MeNB sends the IP address of the LGW of the neighbor base station to the MME, the MeNB also indicates the type of the local breakout bearer corresponding to the IP address of each LGW.

At block 402, the MeNB receives correlation identifier information (may be called a correlation ID) corresponding to the LGW from the MME.

The MME obtains the IP address of the LGW used for setting up the local breakout bearer. During the process of setting up the bearer, the MME obtains a tunnel number assigned by the LGW through a conventional way. The MME sends the tunnel number to the MeNB through the correlation ID. In this case, the correlation ID indicates the tunnel number assigned by the LGW, and further indicates that the bearer is the local breakout bearer. If a variety of types of the local breakout bearer are simultaneously supported, such as SIPTO or LIPA, the correlation ID is configured according to different types. In this case, there are two correlation IDs, one is a correlation ID corresponding to LIPA and the other is a correlation ID corresponding to SIPTO.

Further, the MME may send the IP address of the LGW to the MeNB or send information capable of indicating the IP address of the LGW to the MeNB, such as an identifier of the SeNB and the type of the local breakout bearer (LIPA or SIPTO). Through the identifier of the SeNB and the type of the local breakout bearer, the MeNB may determine an IP address of a LGW corresponding to the correlation ID. When the MeNB sends IP addresses of LGWs of a plurality of neighbor base stations to the MME, the MME needs to include the information to indicate on which base station the local breakout bearer is set up. When the MeNB sends an IP address of a LGW of one neighbor base station to the MME and the MeNB does not support the local breakout bearer and the neighbor base station supports only one type of the local breakout bearer, the information may not be included at the present block. In this case, the MME may indicate, through the correlation ID, that the local breakout bearer is to be set up and the MeNB may determine the corresponding base station.

At block 403, the MeNB forwards the correlation ID to the corresponding neighbor base station.

The MeNB learns that the local breakout bearer is to be set up through the correlation ID configured by the MME. The correlation ID carries the tunnel number. When there is one neighbor base station, the MeNB sends a bearer setup message to the neighbor base station, in which the bearer setup message carries the correlation ID (the tunnel number is carried by the correlation ID). When there are a plurality of neighbor base stations, the MeNB may determine on which neighbor base station the local breakout bearer is to be set up through the IP address of the LGW sent by the MME or the identifier of the SeNB. Afterwards, the MeNB sends the bearer setup message to the corresponding neighbor base station, in which the bearer setup message carries the correlation ID (the tunnel number is carried by the correlation ID).

The neighbor base station receiving the message learns that the bearer is the local breakout bearer through the correlation ID, and learns the type of the local breakout bearer is LIPA or SIPTO because the correlation ID is configured according to each local breakout type. When the local breakout type is determined, the SeNB may determine the IP address of the corresponding LGW. The SeNB sets up the local breakout bearer with the local LGW and the data is directly sent to the local LGW.

FIG. 5 is a flowchart illustrating a second method for setting up the local breakout bearer, according to an example of the present disclosure. Similarly to the method shown in FIG. 4, the method as shown in FIG. 5 is described taking the architecture as shown in FIG. 3 as an example, but not limited to the architecture as shown in FIG. 3. The method may be applied to other architectures. The method includes two implementation ways. According to a first implementation way, before setting up the bearer, the MME informs the MeNB that the bearer to be set up is a local breakout service, and the MeNB determines whether the local breakout bearer may be set up or a common bearer may be set up. According to a second implementation way, the MME sets up the common bearer for the UE, configures a common gateway for the UE, and informs the MeNB that the bearer to be set up is the local breakout service. When the MeNB may set up the local breakout bearer, the MME performs a process of reconfiguring the gateway. The method as shown in FIG. 5 may include following operations.

At block 501, the MME informs the MeNB that the local breakout bearer is to be set up.

When a user applies a local breakout service, the MME informs the MeNB that the bearer to be set up is the local breakout bearer. When a variety of types of the local breakout bearer are supported, the MME may also inform the MeNB that the type of the local breakout bearer is SIPTO, LIPA, or other types.

At block 502, the MeNB informs the MME about an IP address of a LGW corresponding to a neighbor base station.

The MeNB has already learnt that the neighbor base station supports the local breakout bearer during the process of setting up X2 or during other process. As such, the neighbor base station may be configured as the SeNB of the UE.

According to the first implementation way, the MeNB determines that the neighbor base station may be configured as the SeNB of the UE according to whether the neighbor base station supports the local breakout bearer and the measurement report of the UE. The MeNB sends a message to the MME to inform the MME of the IP address of the LGW corresponding to the neighbor base station. Afterwards, the MME may send a create sessionrequest message to the SGW and the LGW and obtain an uplink tunnel number assigned by the LGW. The MME sends a message to the MeNB and the local breakout bearer is set up. In other words, an initial UE context setup request message or a bearer setup request message is sent to the MeNB, which is the same as the prior art. Then, the MeNB sends the message in block 503 to the SeNB.

According to the second implementation way, this process may be omitted. When the process is omitted, the MeNB may send the information about the LGW of the neighbor base station to the MME at block 505.

At block 503, the MeNB informs the neighbor base station that the local breakout bearer is to be set up.

The MeNB has learnt that the neighbor base station supports the local breakout bearer during the process of setting up X2 or other processes. As such, the neighbor base station may be configured as the SeNB of the UE. The MeNB determines to set up the local breakout bearer on the neighbor base station. The MeNB sends the bearer setup request message to the neighbor base station, in which the message indicates that the local breakout bearer is to be set up. The message may further indicates that a type of the local breakout bearer to be set up is LIPA, SIPTO, or any other type.

At block 504, the neighbor base station assigns a tunnel number of the local breakout, and sends the tunnel number to the MeNB.

Through block 503, the neighbor base station learns that the local breakout bearer is to be set up, and also learns the type of the local breakout bearer. The neighbor base station sends the assigned downlink tunnel number to the MeNB.

When the second implementation way is employed, at block 504, the IP address of the LGW and/or the uplink tunnel number assigned by the LGW are also included.

At block 505, the MeNB sends the information received from the neighbor base station to the MME.

When the second implementation way is employed, the MME have selected the gateway for the UE, at this time, the MME may perform the process of reconfiguring the gateway to shift the LGW of the UE to the LGW indicated at block 505. This process is the same as the conventional gateway reconfiguration process, which is not repeated herein.

Hereinafter, the technical schemes described in the present disclosure are described in further detail with reference to two example embodiments.

A First Example Embodiment

FIG. 6 is a flowchart illustrating the first example embodiment of supporting the service local breakout under the small cell architecture, according to an example of the present disclosure. Here, details about steps irrelevant with the example of the present disclosure are omitted. The flow as shown in FIG. 6 may include following operations.

At block 601, an X2 interface is set up between a first base station and a second base station.

During the process of setting up the interface, when there is a LGW collocated with the second base station, the first base station is informed of an IP address of the collocated LGW. When there is a LGW collocated with the first base station, the second base station is informed of an IP address of the collocated LGW.

Alternatively, the first base station sets up a data bearer of the UE on the second base station and sends a bearer setup request to the second base station. When the second base station sends a bearer setup response message, the IP address of the collocated LGW is carried.

At block 602, the UE sends a non-access stratum (NAS) message to the first base station through a radio resource control (RRC) message, in which the first base station is the MeNB of the UE.

At block 603, the MeNB sends an initial UE message or an uplink direct transfer message to the MME, in which the message includes the NAS message received from the UE.

When there is the collocated LGW of the second base station adjacent to the MeNB and the second base station is the SeNB of the UE, or when a signal of the second base station is good enough that is determined through a measurement report of the UE and the second base station may be configured as the SeNB of the UE, the MeNB sends the IP address of the LGW collocated with the second base station through an S1 message at the present block.

At block 604, the MME sends a create session request message to the SGW. According to the received NAS message, when the UE requests the local breakout service, e.g., a SIPTO service in a local network, the MME determines whether to set up a SIPTO bearer for the UE in the local network according to the address information of the LGW received from the MeNB and subscription information of the UE. In this case, the message carries the IP address of the LGW.

At block 605, the SGW sends the create session request message to the LGW.

At block 606, the LGW sends a create session response message to the SGW.

At block 607, the SGW sends the create session response message to the MME.

At block 608, the MME sends an initial context setup request message or an enhanced radio access bearer (ERAB) setup request message to the MeNB.

When the MME determines to set up the local breakout bearer for the UE, such as the local SIPTO bearer, the MME informs the MeNB that the local breakout bearer is set up for the UE through the initial context setup request message or the ERAB setup request message. Through the correlation ID carried in the message, the MME indicates that the bearer is the local breakout bearer, and further indicates the uplink tunnel number assigned by the LGW. When the MME receives IP addresses of a plurality of LGWs from the MeNB, the MME informs, through the S1 message at the present block, the MeNB with which LGW the local breakout bearer is set up, i.e., the message includes an identifier of an eNB where the local breakout bearer is located or the IP address of the LGW.

At block 609, for the local breakout bearer, the MME determines to set up the bearer for the UE on a corresponding base station within the local network. The MeNB selects the base station where the bearer is set up according to the IP address of the LGW sent to the MME and the correlation ID received from the MME. Alternatively, the MeNB selects the base station where the bearer is set up according to the IP address of the LGW sent to the MME, the correlation ID received from the MME, and the IP address of the LGW or an address of the base station. Then, the MeNB sends a Scell setup request message to the second base station. In this case, the second base station may be configured as the SeNB of the UE.

The Scell setup request may include the correlation ID. The SeNB determines whether to set up the local breakout bearer according to the correlation ID.

At block 610, the SeNB allocates resources and sends a Scell setup response message to the MeNB.

At block 611, a RB bearer at the air interface is set up for the UE.

At block 612, the MeNB sends an initial context setup response message or an ERAB setup response message to the MME.

At block 613, the MME sends a bearer modifying request message to the SGW/LGW.

At block 614, the SGW/LGW sends a bearer modifying response message to the MME.

A Second Example Embodiment

FIG. 7 is a flowchart illustrating the second example embodiment of supporting the service local breakout under the small cell architecture, according to an example of the present disclosure. Here, details about steps irrelevant with the example of the present disclosure are omitted. The flow as shown in FIG. 7 may include following operations.

At block 701, an X2 interface is set up between a first base station and a second base station.

During the process of setting up the interface, when there is a LGW collocated with the second base station, the first base station is informed of an IP address of the collocated LGW. When there is a LGW collocated with the first base station, the second base station is informed of an IP address of the collocated LGW.

Alternatively, the first base station sets up a data bearer of the UE on the second base station and sends a bearer setup request to the second base station. When the second base station sends a bearer setup response message, the IP address of the collocated LGW is carried.

At block 702, the UE sends a NAS message to the first base station through a RRC message, in which the first base station is the MeNB of the UE.

At block 703, the MeNB sends an initial UE message or an uplink direct transfer message to the MME, in which the message includes the NAS message received from the UE.

At block 704, the MME sends a routing request message to the MeNB.

The MME learns that the UE requests the local breakout bearer, but the MME doesn't know whether the MeNB can set up the bearer on a base station supporting the local breakout, because the MME has an S1 control plan only with the MeNB and the MME doesn't know whether the MeNB can set up the local breakout bearer on another base station supporting the local breakout. As such, indicating information of the local breakout bearer is carried in the routing request message by the MME to inform the MeNB what is applied for the UE is the local breakout bearer. The indicating information of the local breakout bearer may indicate a type of the local breakout bearer, such as SIPTO or LIPA.

At block 705, the MeNB sends a routing request response message to the MME.

The message includes an IP address of a LGW capable of setting up the above local breakout bearer. The address of the LGW is the address of the collocated LGW of the neighbor second base station obtained at block 701.

At block 706, the MME sends a create session request message to the SGW.

At block 707, the SGW sends the create session request message to the LGW.

At block 708, the LGW sends a create session response message to the SGW.

At block 709, the SGW sends the create session response message to the MME.

At block 710, the MME sends an initial context setup request message or an ERAB setup request message to the MeNB.

At block 711, the MeNB selects the second base station as the SeNB of the UE according to IP addresses of LGWs of neighbor base stations, the indicating information of the local breakout bearer sent from the MME, and the measurement report of the UE. The local breakout bearer may be set up on the second base station. The MeNB sends a Scell setup request message to the second base station.

The Scell setup request may carry the indicating information of the local breakout bearer. The SeNB determines whether to set up the local breakout bearer according to the indicating information of the local breakout bearer.

At block 712, the SeNB allocates resources and sends a Scell setup response message to the MeNB. The response message may include the downlink tunnel number assigned by the SeNB and the uplink tunnel number assigned by the LGW collocated with the SeNB. The response message may further include the IP address of the LGW.

At block 713, a RB bearer at the air interface is set up for the UE.

At block 714, the MeNB sends an initial context setup response message or an ERAB setup response message to the MME. The message carries the IP address of the LGW collocated with the SeNB and the uplink tunnel number assigned by the LGW.

At block 715, the MME sends a bearer modifying request message to the SGW/LGW.

At block 716, the SGW/LGW sends a bearer modifying response message to the MME.

Corresponding to the method as shown in FIG. 4, various examples of the present disclosure describe a device as shown in FIG. 8. The device includes a LGW information processing module, an indicating information obtaining module, and an indicating information forwarding module.

The LGW information processing module may send an IP address of a LGW corresponding to a neighbor base station.

The indicating information obtaining module may receive correlation identifier information associated with the LGW, in which the correlation identifier information includes a tunnel number which indicates to set up a local breakout bearer.

The indicating information forwarding module may forward the correlation identifier information.

Corresponding to the method as shown in FIG. 5, various examples of the present disclosure describe a device as shown in FIG. 9. The device includes a first interaction module and a second interaction module.

The first interaction module may learn that a local breakout bearer is to be set up.

The second interaction module may inform the setup of the local breakout bearer, and receive a downlink tunnel number of the local breakout.

The first interaction module may send an IP address of a LGW corresponding to a neighbor base station, and send the downlink tunnel number of the local breakout.

The above are examples of the present disclosure, and are not used for limiting the present disclosure. Any modifications, equivalents, improvements, etc., made under the spirit and principle of the present disclosure should be included in the protection scope of the present disclosure.

The invention claimed is:

1. A method for setting up local breakout bearers, comprising:
   sending, by a master base station (MeNB) to a mobile management entity (MME), IP addresses of local gateways (LGWs) associated with a neighbor base station supporting a plurality of types of local breakout bearers, the IP addresses of the LGWs respectively corresponding to the plurality of types of local breakout bearers;
   receiving, by the MeNB, from the MME, correlation identifier information associated with the LGWs,
   wherein the correlation identifier information comprises a tunnel number indicating a local breakout bearer is to be set up, and the correlation identifier information is configured based on a type of the local breakout bearer; and
   forwarding, by the MeNB to the neighbor base station, the correlation identifier information.

2. The method of claim 1, wherein sending, by the MeNB to the MME, the IP address of the LGW corresponding to the neighbor base station comprises:
   based on a measurement report of a user equipment (UE), sending, by the MeNB, an IP address of a LGW corresponding to a base station capable of being a secondary base station (SeNB) of the UE; or
   sending, by the MeNB, an IP address of a LGW corresponding to the SeNB of the UE.

3. The method of claim 1, further comprising:
   during an X2 setup process or a bearer setup process, receiving, by the MeNB, an IP address of a LGW collocated with the neighbor base station.

4. The method of claim 1, wherein the correlation identifier information associated with the LGW includes:
   a plurality of correlation IDs respectively correspond to the plurality of types of the local breakout bearers, and the method further comprising:

receiving, by the MeNB from the MME, at least one IP address of at least one LGW or information capable of indicating the at least one IP address of the at least one LGW.

5. A base station, comprising:
a local gateway (LGW) information processing module configured to send, to a mobile management entity (MME), IP addresses of LGWs associated with a neighbor base station supporting a plurality of types of local breakout bearers, the IP addresses of the LGWs respectively corresponding to the plurality of types of local breakout bearers;
an indicating information obtaining module configured to receive, from the MME, correlation identifier information associated with the LGWs, wherein the correlation identifier information comprises a tunnel number that indicates to set up a local breakout bearer, and the correlation identifier information is configured based on a type of the local breakout bearer; and
an indicating information forwarding module configured to forward, to the neighbor base station, the correlation identifier information.

6. A method for setting up local breakout bearers, comprising:
receiving, by a master base station (MeNB) from a mobile management entity (MME), information indicating that a local breakout bearer is to be set up, wherein the information includes a plurality of correlation IDs respectively corresponding to a plurality of types of the local breakout bearers supported by a neighbor base station;
informing, by the MeNB, the neighbor base station to set up the local breakout bearer;
receiving, by the MeNB from the neighbor base station, a downlink tunnel number of local breakout; and
sending, by the MeNB to the MME, an IP address of a local gateway (LGW) corresponding to the neighbor base station, and sending the downlink tunnel number of the local breakout.

7. The method of claim 6, wherein sending, by the MeNB to the MME, the IP address of the LGW corresponding to the neighbor base station comprises:
based on a measurement report of a user equipment (UE), sending, by the MeNB, an IP address of a LGW corresponding to a base station capable of being a secondary base station (SeNB) of the UE.

8. The method of claim 6, wherein when a common bearer is set up for the UE, the method further comprises:
receiving, by the MeNB, an uplink tunnel number and sending the uplink tunnel number.

* * * * *